US011402528B2

(12) United States Patent
Song

(10) Patent No.: US 11,402,528 B2
(45) Date of Patent: Aug. 2, 2022

(54) WAVEFIELD PROPAGATOR FOR TILTED ORTHORHOMBIC MEDIA

(71) Applicant: BP Corporation North America Inc., Houston, TX (US)

(72) Inventor: Xiaolei Song, Houston, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 688 days.

(21) Appl. No.: 16/359,570

(22) Filed: Mar. 20, 2019

(65) Prior Publication Data

US 2019/0302289 A1 Oct. 3, 2019

Related U.S. Application Data

(60) Provisional application No. 62/650,574, filed on Mar. 30, 2018.

(51) Int. Cl.
*G01V 1/28* (2006.01)
*G01V 1/18* (2006.01)
(Continued)

(52) U.S. Cl.
CPC .............. *G01V 1/282* (2013.01); *G01V 1/186* (2013.01); *G01V 1/303* (2013.01); *G01V 1/325* (2013.01); *G01V 2210/42* (2013.01); *G01V 2210/44* (2013.01); *G01V 2210/512* (2013.01); *G01V 2210/586* (2013.01); *G01V 2210/614* (2013.01);
(Continued)

(58) Field of Classification Search
CPC ........ G01V 1/186; G01V 1/282; G01V 1/303; G01V 1/325; G01V 2210/42; G01V 2210/44; G01V 2210/512; G01V 2210/586; G01V 2210/6222; G01V 2210/64;
(Continued)

(56) References Cited

U.S. PATENT DOCUMENTS

| 5,451,164 A * | 9/1995 | Henderson ............. G01V 1/282 434/299 |
| 6,904,368 B2 * | 6/2005 | Reshef .................. G01V 1/362 702/17 |
| 9,348,044 B2 | 5/2016 | Xu et al. |

FOREIGN PATENT DOCUMENTS

| GB | 2490215 A * | 10/2012 | ............... G01V 1/30 |
| WO | WO 2015/104059 A1 | 7/2016 | |

OTHER PUBLICATIONS

Song, Xiaolei & Sergey Formel, "Fourier Finite—Difference Wave Propagation", published in Geophysics, 76,T123-T129, (2011), which first proposed and implemented two-way FFD algorithm and derived coefficents for 3D.

(Continued)

*Primary Examiner* — Elias Desta
(74) *Attorney, Agent, or Firm* — Conley Rose, P.C.

(57) ABSTRACT

Systems and methods that include receiving reservoir data of a hydrocarbon reservoir, receive an indication related to selection of a wavefield propagator, application of the wavefield propagator utilizing Fourier Finite Transforms and Finite Differences to model a wavefield associated with a Tilted Orthorhombic media representative of a region of a subsurface comprising the hydrocarbon reservoir, and processing the reservoir data in conjunction the wavefield propagator to generate an output for use with seismic exploration above a region of a subsurface comprising the hydrocarbon reservoir and containing structural or stratigraphic features conducive to a presence, migration, or accumulation of hydrocarbons.

18 Claims, 6 Drawing Sheets

(51) Int. Cl.
*G01V 1/32* (2006.01)
*G01V 1/30* (2006.01)

(52) U.S. Cl.
CPC .. *G01V 2210/6222* (2013.01); *G01V 2210/64* (2013.01); *G01V 2210/673* (2013.01); *G01V 2210/677* (2013.01); *G01V 2210/679* (2013.01)

(58) Field of Classification Search
CPC ....... G01V 2210/673; G01V 2210/677; G01V 2210/679
See application file for complete search history.

(56) References Cited

OTHER PUBLICATIONS

Song, Xiaolei; "Scalar Wavefield Time Domain Propagation in 3D TTI Media with Fourier Finite Differences", (2017), 87th Annual International Meeting, Society Expl. Geophys., 4153-4158.

Song, Xiaolei & Alkhalifah, Tariq; "Modeling of pseudoacoustic P-waves in orthorhombic media with a low-rank approximation." Geophysics, vol. 78, No. 4; Jul.-Aug. 2013;pp. C33--C40.

Song, Xiaolei; Fomel, Sergey; & Ying, Lexing; "Lowrank finite-differences and lowrank Fourier finite-differences for seismic wave extrapolation in the acoustic approximation." Geophysical Journal Intl; (2013)193,960-969.

Fei, Tong W. & Liner, Christopher L; "Hybrid Fourier finite difference 3D depth migration for anisotropic media." Geophysics; vol. 73; No. 2; Mar./Apr. 2008; p. S27-S34.

WO-501283 Search Report—dated Jun. 4, 2019.

\* cited by examiner

WAVEFIELD PROPAGATOR FOR TILTED ORTHORHOMBIC MEDIA

BACKGROUND

The present disclosure relates generally to analyzing seismic data, and more specifically, to utilizing a wavefield propagator to process seismic measurements.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending sound energy down into the ground and recording the reflected sound energy that returns from the geological layers within the subsurface region. During a seismic survey, an energy source is placed at various locations on or above the surface region of the Earth, which may include hydrocarbon deposits. Each time the source is activated, the source generates a seismic (e.g., sound wave) signal that travels downward through the Earth, is reflected, and, upon its return, is recorded using one or more receivers disposed on or above the subsurface region of the Earth. The seismic data recorded by the receivers may then be used to create an image or profile of the corresponding subsurface region.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Seismic processing may include, for example, seismic data migration, full waveform inversion processing, reverse time migration, and other techniques that utilize accurate (and often complex) representations of a subsurface. The representation of the subsurface that is generated may be termed a wavefield propagator (or a wave propagator) and various techniques may be applied as wave propagation methods to generate different types of wavefield propagators for use in seismic processing. In some embodiments, these propagation methods may include a pseudo-spectral (PS) wave propagation method, a tilted transversely isotropic (TTI) wave propagation method (such as a TTI Fourier Finite Differences (FFD) wave propagation method), and a Tilted Orthorhombic FFD (TORFFD) wave propagation method (which, for example, may be a chain operator of Fourier Finite Transforms and Finite Differences). As will be discussed in greater detail below, use of the TORFFD wave propagation method may allow for greater resolution images of a region of a subsurface comprising a hydrocarbon reservoir and containing structural or stratigraphic features conducive to a presence, migration, or accumulation of hydrocarbons generated via processing of received seismic data relative to a TTI wave propagation method, while improving at least on processing time required utilizing a pseudo-spectral wave propagation method.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Seismic data may provide valuable information with regard to the description such as the location and/or change of hydrocarbon deposits within a subsurface region of the Earth. Different processing techniques, such as the application of different wave propagation methods for particularly selected media (e.g., for selected representations of a subsurface region of the Earth as wavefield propagators) result in different images generated by the processing of the seismic data and/or different amounts of time to generate the different images generated by the processing of the seismic data. Accordingly, there may be situations in which a particular chosen media (or wavefield propagator) may benefit from a particular type of wave propagation method. The present application details at least one wave propagation method that may beneficially be used in conjunction with Tilted Orthorhombic (TOR) media.

Figure 1:
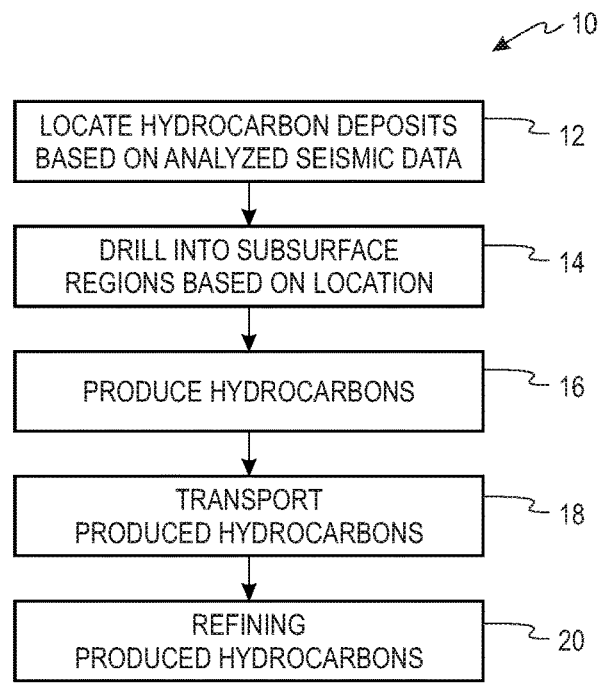
FIG. 1 is a flow chart of various processes that may be performed based on analysis of seismic data acquired via a seismic survey system, in accordance with embodiments presented herein.
Figure 2:
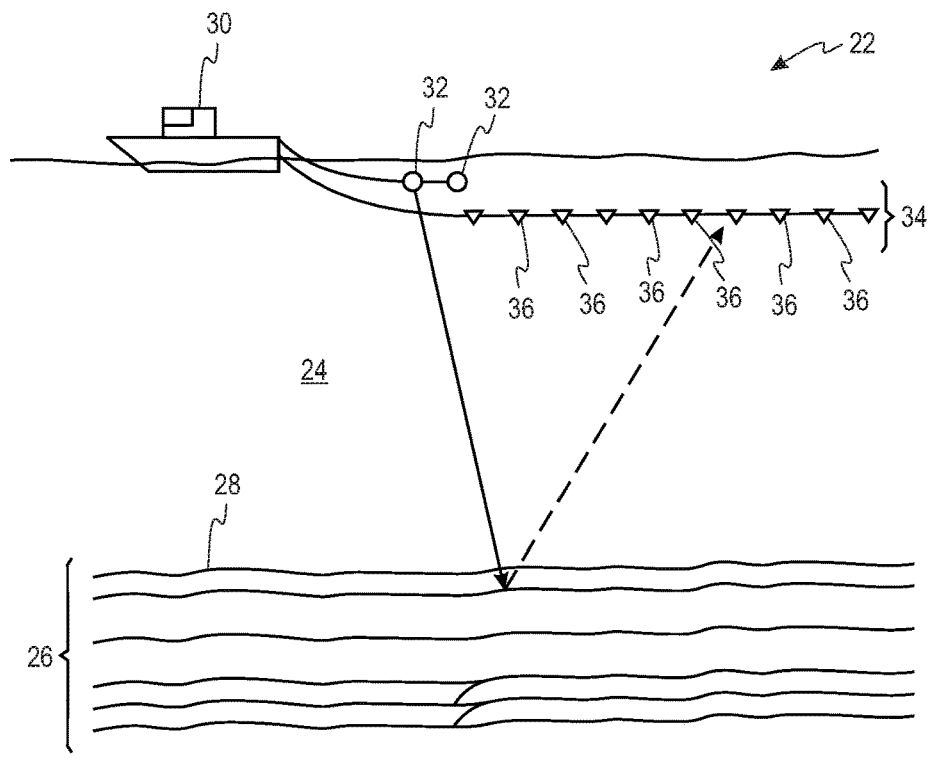
FIG. 2 is a schematic diagram of a marine survey system in a marine environment, in accordance with embodiments presented herein.
Figure 3:
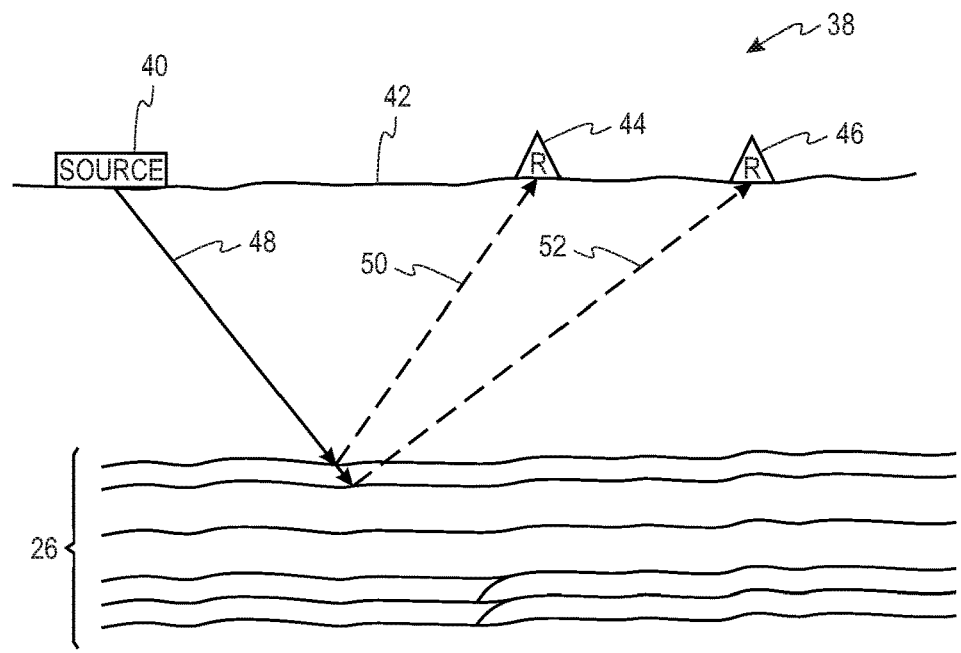
FIG. 3 is a schematic diagram of a second marine survey system in a marine environment, in accordance with embodiments presented herein

By way of introduction, seismic data may be acquired using a variety of seismic survey systems and techniques, two of which are discussed with respect to FIG. 2 and FIG. 3. Regardless of the seismic data gathering technique utilized, after the seismic data is acquired, a computing system may analyze the acquired seismic data and may use the results of the seismic data analysis (e.g., seismogram, map of geological formations, etc.) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it should be noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired may be analyzed to generate a map or profile that illustrates various geological formations within the subsurface region. Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries and the like via transport vehicles, pipelines, and the like. At block 20, the produced hydrocarbons may be processed according to various refining procedures to develop different products using the hydrocarbons.

It should be noted that the processes discussed with regard to the method 10 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the subsurface region.

With the foregoing in mind, FIG. 2 is a schematic diagram of a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, one or more seismic sources 32, a (seismic) streamer 34, one or more (seismic) receivers 36, and/or other equipment that may assist in acquiring seismic images representative of geological formations within a subsurface region 26 of the Earth. The vessel 30 may tow the seismic source(s) 32 (e.g., an air gun array) that may produce energy, such as sound waves (e.g., seismic waveforms), that is directed at a seafloor 28. The vessel 30 may also tow the streamer 34 having a receiver 36 (e.g., hydrophones) that may acquire seismic waveforms that represent the energy output by the seismic source(s) 32 subsequent to being reflected off of various geological formations (e.g., salt domes, faults, folds, etc.) within the subsurface region 26. Additionally, although the description of the marine survey system 22 is described with one seismic source 32 (represented in FIG. 2 as an air gun array) and one receiver 36 (represented in FIG. 2 as a set of hydrophones), it should be noted that the marine survey system 22 may include multiple seismic sources 32 and multiple receivers 36. In the same manner, although the above descriptions of the marine survey system 22 is described with one streamer 34, it should be noted that the marine survey system 22 may include multiple streamers similar to streamer 34. In addition, additional vessels 30 may include additional source(s) 32, streamer(s) 34, and the like to perform the operations of the marine survey system 22.

FIG. 3 is a block diagram of a land survey system 38 (e.g., for use in conjunction with block 12 of FIG. 1) that may be employed to obtain information regarding the subsurface region 26 of the Earth in a non-marine environment. The land survey system 38 may include a land-based seismic source 40 and land-based receiver 44. In some embodiments, the land survey system 38 may include multiple land-based seismic sources 40 and one or more land-based receivers 44 and 46. Indeed, for discussion purposes, the land survey system 38 includes a land-based seismic source 40 and two land-based receivers 44 and 46. The land-based seismic source 40 (e.g., seismic vibrator) that may be disposed on a surface 42 of the Earth above the subsurface region 26 of interest. The land-based seismic source 40 may produce energy (e.g., sound waves, seismic waveforms) that is directed at the subsurface region 26 of the Earth. Upon reaching various geological formations (e.g., salt domes, faults, folds) within the subsurface region 26 the energy output by the land-based seismic source 40 may be reflected off of the geological formations and acquired or recorded by one or more land-based receivers (e.g., 44 and 46).

In some embodiments, the land-based receivers 44 and 46 may be dispersed across the surface 42 of the Earth to form a grid-like pattern. As such, each land-based receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first receiver 44 may receive the reflection of the seismic waveform 48 off of one geological formation and a second receiver 46 may receive the reflection of the seismic waveform 48 off of a different geological formation. As such, the first receiver 44 may receive a reflected seismic waveform 50 and the second receiver 46 may receive a reflected seismic waveform 52.

Figure 4:
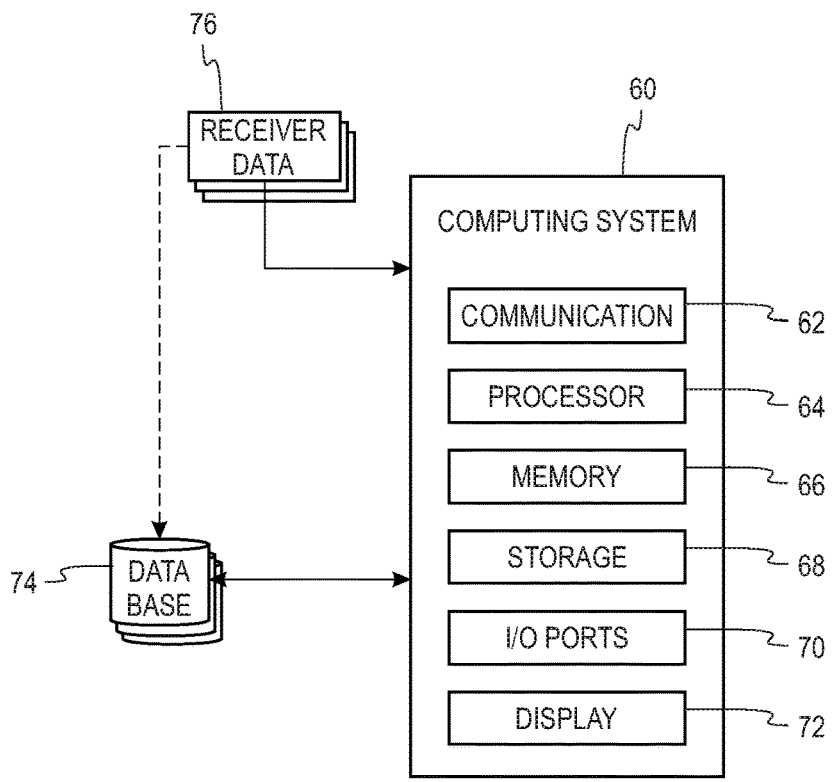
FIG. 4 is a block diagram of a computing system that may perform operations described herein based on data acquired via the marine survey system of FIG. 2 and/or the second marine survey system of FIG. 3, in accordance with embodiments presented herein.

Regardless of how the seismic data is acquired, a computing system (e.g., for use in conjunction with block 12 of FIG. 1) may analyze the seismic waveforms acquired by the receivers 36, 44, 46 to determine seismic information regarding the geological structure, the location and property of hydrocarbon deposits, and the like within the subsurface region 26. FIG. 4 is a block diagram of an example of such a computing system 60 that may perform various data analysis operations to analyze the seismic data acquired by the receivers 36, 44, 46 to determine the structure and/or predict seismic properties of the geological formations within the subsurface region 26.

Referring now to FIG. 4, the computing system 60 may include a communication component 62, a processor 64, memory 66, storage 68, input/output (I/O) ports 70, and a display 72. In some embodiments, the computing system 60 may omit one or more of the display 72, the communication component 62, and/or the input/output (I/O) ports 70. The communication component 62 may be a wireless or wired communication component that may facilitate communication between the receivers 36, 44, 46, one or more databases 74, other computing devices, and/or other communication capable devices. In one embodiment, the computing system 60 may receive receiver data 76 (e.g., seismic data, seismograms, etc.) via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also be used to store the data, analysis of the data, the software applications, and the like. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

The I/O ports 70 may be interfaces that may couple to other peripheral components such as input devices (e.g., keyboard, mouse), sensors, input/output (I/O) modules, and the like. I/O ports 70 may enable the computing system 60 to communicate with the other devices in the marine survey system 22, the land survey system 38, or the like via the I/O ports 70.

The display 72 may depict visualizations associated with software or executable code being processed by the processor 64. In one embodiment, the display 72 may be a touch display capable of receiving inputs from a user of the computing system 60. The display 72 may also be used to view and analyze results of the analysis of the acquired seismic data to determine the geological formations within the subsurface region 26, the location and property of hydrocarbon deposits within the subsurface region 26, predictions of seismic properties associated with one or more wells in the subsurface region 26, and the like. The display 72 may be any suitable type of display, such as a liquid crystal display (LCD), plasma display, or an organic light emitting diode (OLED) display, for example. In addition to depicting the visualization described herein via the display 72, it should be noted that the computing system 60 may also depict the visualization via other tangible elements, such as paper (e.g., via printing) and the like.

With the foregoing in mind, the present techniques described herein may also be performed using a supercomputer that employs multiple computing systems 60, a cloud-computing system, or the like to distribute processes to be performed across multiple computing systems 60. In this case, each computing system 60 operating as part of a super computer may not include each component listed as part of the computing system 60. For example, each computing system 60 may not include the display 72 since multiple displays 72 may not be useful to for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, and the like regarding the subsurface region 26.

Although the components described above have been discussed with regard to the computing system 60, it should be noted that similar components may make up the computing system 60. Moreover, the computing system 60 may also be part of the marine survey system 22 or the land survey system 38, and thus may monitor and control certain operations of the sources 32 or 40, the receivers 36, 44, 46, and the like. Further, it should be noted that the listed components are provided as example components and the embodiments described herein are not to be limited to the components described with reference to FIG. 4.

In some embodiments, the computing system 60 may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that can extend for some distance. In a two-dimensional (2-D) seismic survey, the receiver locations may be placed along a single line, whereas in a three-dimensional (3-D) survey the receiver locations may be distributed across the surface in a grid pattern. As such, a 2-D seismic survey may provide a cross sectional picture (vertical slice) of the Earth layers as they exist directly beneath the recording locations. A 3-D seismic survey, on the other hand, may create a data "cube" or volume that may correspond to a 3-D picture of the subsurface region 26.

In addition, a 4-D (or time-lapse) seismic survey may include seismic data acquired during a 3-D survey at multiple times. Using the different seismic images acquired at different times, the computing system 60 may compare the two images to identify changes in the subsurface region 26.

In any case, a seismic survey may be composed of a very large number of individual seismic recordings or traces. As such, the computing system 60 may be employed to analyze the acquired seismic data to obtain an image representative of the subsurface region 26 and to determine locations and properties of hydrocarbon deposits. To that end, a variety of seismic data processing algorithms may be used to remove noise from the acquired seismic data, migrate the pre-processed seismic data, identify shifts between multiple seismic images, align multiple seismic images, and the like.

After the computing system 60 analyzes the acquired seismic data, the results of the seismic data analysis (e.g., seismogram, seismic images, map of geological formations, etc.) may be used to perform various operations within the hydrocarbon exploration and production industries. For instance, as described above, the acquired seismic data may be used to perform the method 10 of FIG. 1 that details various processes that may be undertaken based on the analysis of the acquired seismic data.

Figure 5:
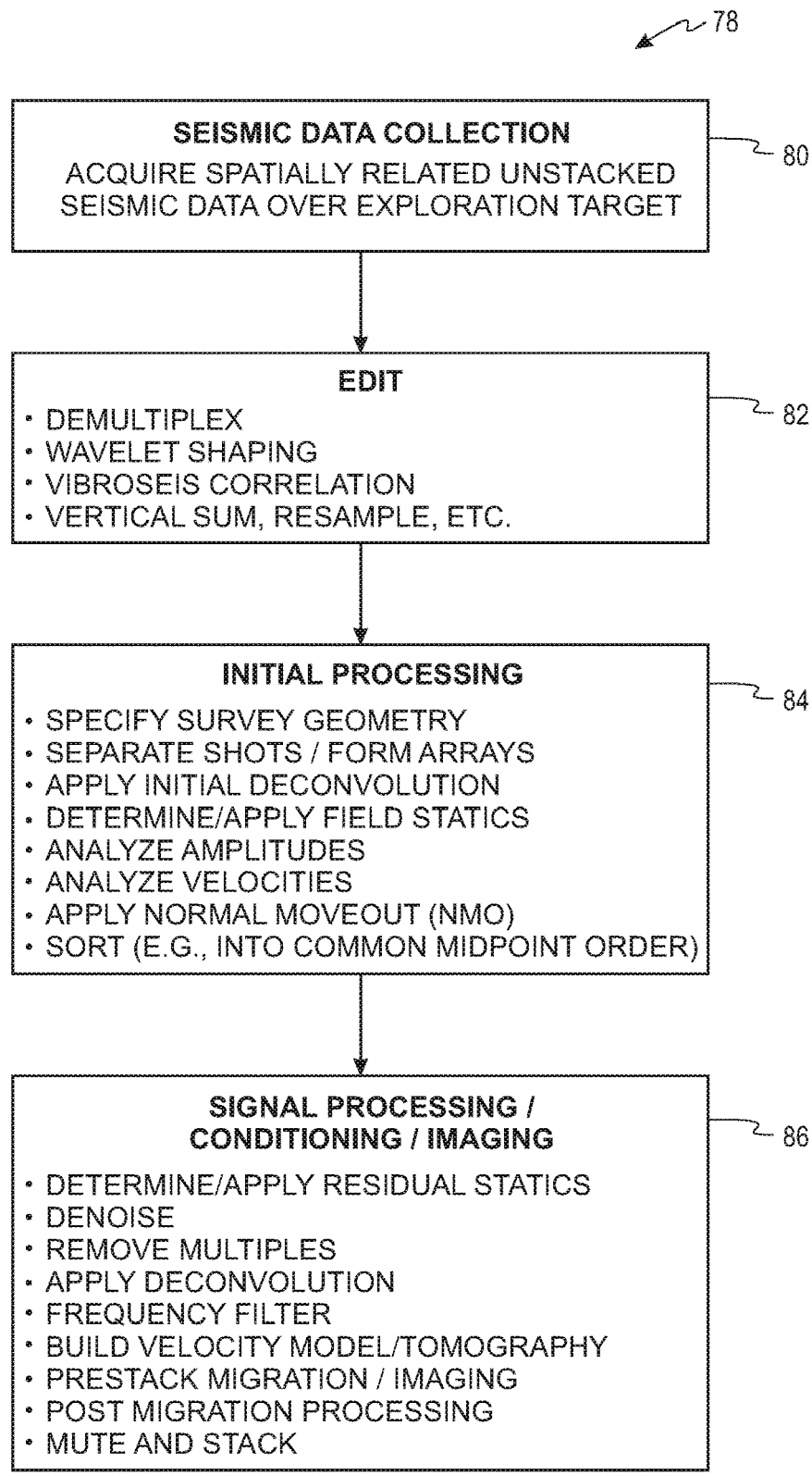
FIG. 5 is a flow chart of a method for generating a seismic image via the computing system of FIG. 4, in accordance with embodiments presented herein.

In some embodiments, the results of the seismic data analysis may be generated in conjunction with a seismic processing scheme such as, for example, the method 78 illustrated in FIG. 5. As illustrated, method 78 includes a seismic processing sequence that includes seismic data collection in step 80, editing of the seismic data in step 82, initial processing in step 84, and signal processing, conditioning, and imaging (which may, for example, include production of imaged sections or volumes as well as the wave propagation methods described herein used, for example, in connection with the illustrated migration process(es)) in step 86 prior to any interpretation of the seismic data, any further image enhancement consistent with the exploration objectives desired, generation of attributes from the processed seismic data, reinterpretation of the seismic data as needed, and determination and/or generation of a drilling prospect or other seismic survey applications. As a result of the processing method 78, location of hydrocarbons within a subsurface region 26 may be identified. Techniques for seismic modeling generally, and more specifically, wave propagation methods that may beneficially be used in conjunction with Tilted Orthorhombic (TOR) media to improve upon the processing results of seismic data so as to allow for better detection of hydrocarbons within a subsurface region 26.

In one embodiment, a two-way scalar wavefield propagator for TOR media is generated. The wavefield propagator for TOR media may adopt a pseudo-acoustic P-wave dispersion relation in the corresponding media. The wavefield propagator for TOR media combines Fast Fourier Transform (FFT) and Finite Differences (FD) operations to result in a Tilted Orthorhombic FFD (TORFFD) wave propagation method which, as a scalar operator, can also overcome the coupling of qP-waves and qSV-waves present in the TOR media.

When used for TOR media, the TORFFD wave propagation method (and resultant wavefield propagator) may, for example, utilize two points per wavefield sampling in 3D space, similar to a pseudo-spectral (PS) wave propagation method for TOR media. However, efficiencies are present by utilizing the TORFFD wave propagation method in place of a PS wave propagation method, for example, utilizing the TORFFD wave propagation method includes the calculation of 2 forward FFTs, 3 inverse FFTs, and 1 FD operation in each time step compared to 30 FFTs for the PS wave propagation method. Furthermore, use of the TORFFD wave propagation method allows for a larger time step relative to a PS wave propagation method, for example, having a courant number being as large as 0.555 as well as accelerated processing times (e.g. up to approximately two times as fast, approximately three times as fast, approximately four times as fast, approximately five times as fast, or approximately six times as fast a PS wave propagation method) while achieving resultant accuracy gains relative to a PS wave propagation method.

The theoretical underpinnings of the present TORFFD wave propagation method and associated wave propagator are described below. An acoustic wave equation used in seismic modeling and reverse time migration (e.g., a technique for imaging seismic data) is expressed as:

$$\frac{\partial^2 p}{\partial t^2} = v(x)^2 \nabla^2 p, \quad \text{(Equation 1)}$$

As set forth in Equation 1, $p(x, t)$ is the seismic pressure wavefield, and $v(x)$ is the propagation velocity. An acoustic pressure solution for Equation 1 may be represented as:

$$p(x, t+\Delta t) + p(x, t-\Delta t) - 2p(x, t) = \quad \text{(Equation 2)}$$
$$2\int_{-\infty}^{+\infty} \hat{p}(k, t)(\cos(|k|v\Delta t) - 1)e^{-ik \cdot x} dk.$$

Equation 2 may operate as a solution in the case of a constant-velocity medium with the aid of FFT. In a model with variable velocity, Equation 2 can provide an approximation by replacing v with $v(x)$. Further, in the case of TOR, the term $v(x) |k|$ on the right-hand side of Equation 2 can be replaced with the acoustic approximation $f(v, k)$, yielding:

$$f(v, k) = \quad \text{(Equation 3)}$$
$$\sqrt{v_{zz}\hat{k}_z^2 + v_{xx}\hat{k}_x^2 + v_{yy}\hat{k}_y^2 - v_{yz}\frac{\hat{k}_y^2 \hat{k}_z^2}{|k|^2} - v_{xz}\frac{\hat{k}_x^2 \hat{k}_z^2}{|k|^2} - v_{xy}\frac{\hat{k}_x^2 \hat{k}_y^2}{|k|^2}},$$

$$v = (v_z, \varepsilon_1, \varepsilon_2, \delta_1, \delta_2, \delta_3, \theta, \phi, \psi),$$
$$k = (k_x, k_y, k_z),$$
$$v_{zz} = v_z^2,$$
$$v_{xx} = v_{zz}(1 + 2\varepsilon_2),$$
$$v_{yy} = v_{zz}(1 + 2\varepsilon_1),$$
$$v_{xy} = 2v_{xx}\left(\delta_3 - \frac{\varepsilon_1 - \varepsilon_2}{1 + 2\varepsilon_2}\right),$$
$$v_{xz} = 2v_{zz}(\delta_2 + \varepsilon_2),$$
$$v_{yz} = 2v_{zz}(\delta_1 - \varepsilon_1),$$

As set forth in Equation 3, $\theta$ is the dip angle measured with respect to vertical, $\varphi$ is the azimuth angle between the projection of the TI symmetry axis in the horizontal plane and the original X-coordinate, $\psi$ is the rotation angle around the TI axis, $\varepsilon_1$, $\varepsilon_2$, $\delta_1$, $\delta_2$, and $\delta_3$ are extended Thomsen parameters for orthorhombic media, $v_z$ is the P-wave phase velocity along the TI symmetry axis, with the direction of $(c_x, c_y, c_z) = \{\sin\theta\cos\varphi, \sin\theta\sin\varphi, \cos\theta\}$ while the "fast" velocity is along the direction of $(r_x, r_y, r_z) = \{\cos\theta\cos\varphi\cos\psi - \sin\varphi\sin\psi, \cos\theta\sin\varphi\cos\psi + \cos\varphi\sin\psi, -\sin\theta\cos\psi\}$, and $\hat{k}_x$, $\hat{k}_y$, and $\hat{k}_z$ represent the wavenumbers evaluated in a rotated coordinate system aligned with a new axis.

When using Equation 2 to propagate waves in heterogeneous media, a FFT can no longer be applied directly for the inverse Fourier transform from the wavenumber domain back to the space domain. As a solution, Fourier Finite Differences (FFD), as a chain operator of the FFT and FD operators may be utilized such that at each time step, the FFD method first propagates the current wavefield using global reference parameters, and then applies the wavefield correction according to variations of local model parameters by Finite Differences. The present techniques for a wavefield propagator for TOR media may utilize a similar approach by transforming the space-wavenumber mixed-domain term on the right-hand side of Equation 2 into a product of two terms:

$$[\cos(f(v,k)\Delta t) - 1] = \left[\frac{\cos(f(v_0,k)\Delta t) - 1}{|k|^2}\right]\left[\frac{(\cos(f(v,k)\Delta t) - 1)|k|^2}{\cos(f(v_0,k)\Delta t) - 1}\right], \quad \text{(Equation 4)}$$

As set forth in Equation 4, $v_0$ represents reference parameters. The first term on the right hand side of Equation 4 is purely a function of k. So we can use the inverse FFT to return to the space domain during the calculation. The remaining term $G(v, k)$ may be solved by transforming the phase shift in the wavenumber domain to finite differences in space with the following approximation:

$$G(v,k) = \frac{(\cos(f(v,k)\Delta t) - 1)|k|^2}{\cos(f(v_0,k)\Delta t) - 1} \approx \quad \text{(Equation 5)}$$

$$a + 2\sum_{n=1}^{3}[b_n\cos(k_n\Delta x_n) + d_n\cos(2k_n\Delta x_n)] +$$

$$2\sum_{n=1}^{3}[cp_n\cos(k_i\Delta x_i + k_j\Delta x_j) +$$

$$cm_n\cos(k_i\Delta x_i - k_j\Delta x_j)] = H(v,k),$$

As set forth in Equation 5, i, j=1, 2, 3; i≠j; i, j≠n and a, $b_n$, $c_{pn}$, $c_{mn}$ and $d_n$ are determined from a Taylor expansion around k=0, illustrated in Table 1 as variables of local model parameters in space and serve as the 4$^{th}$ order FD coefficients (with i=1, 2, 3):

TABLE 1

| | |
|---|---|
| a | $-2\sum_{n=1}^{3}(b_n + cm_n + cp_n + d_n)$ |
| $b_1$ | $-4d_1 - bb_2 - bb_3 - \frac{g_1}{\Delta x^2}$ |
| $b_2$ | $-4d_2 - bb_3 - bb_1 - \frac{g_2}{\Delta y^2}$ |
| $b_3$ | $-4d_3 - bb_1 - bb_2 - \frac{g_3}{\Delta z^2}$ |
| $d_1$ | $\frac{1}{12}\left(\frac{g_1}{\Delta x^2} + \frac{q_1}{\Delta x^4}\right)$ |
| $d_2$ | $\frac{1}{12}\left(\frac{g_2}{\Delta y^2} + \frac{q_2}{\Delta y^4}\right)$ |

TABLE 1-continued

| | |
|---|---|
| $d_3$ | $\frac{1}{12}\left(\frac{g_3}{\Delta z^2} + \frac{q_3}{\Delta z^4}\right)$ |
| $cm_i$ | $\frac{1}{2}(bb_i - aa_i)$ |
| $cp_i$ | $\frac{1}{2}(bb_i + aa_i)$ |

Table 2 provides further expressions of variables that appear in Table 1, in which $w_{0i}$ has a similar expression as $w_i$ with all the space variables v replaced by the corresponding constant model parameters $v_0$.

TABLE 2

| | |
|---|---|
| $cs_1$ | $c_x^2$ |
| $cs_2$ | $c_y^2$ |
| $cs_3$ | $c_z^2$ |
| $cs_4$ | $\frac{1}{2}(c_y + c_z)^2$ |
| $cs_5$ | $\frac{1}{2}(c_x + c_z)^2$ |
| $cs_6$ | $\frac{1}{2}(c_x + c_y)^2$ |
| $cs_7$ | $\frac{1}{2}(c_y - c_z)^2$ |
| $cs_8$ | $\frac{1}{2}(c_x - c_z)^2$ |
| $cs_9$ | $\frac{1}{2}(c_x - c_y)^2$ |
| $rs_1$ | $r_x^2$ |
| $rs_2$ | $r_y^2$ |
| $rs_3$ | $r_z^2$ |
| $rs_4$ | $\frac{1}{2}(r_y + r_z)^2$ |
| $rs_5$ | $\frac{1}{2}(r_x + r_z)^2$ |
| $rs_6$ | $\frac{1}{2}(r_x + r_y)^2$ |
| $rs_7$ | $\frac{1}{2}(r_y - r_z)^2$ |
| $rs_8$ | $\frac{1}{2}(r_x - r_z)^2$ |
| $rs_9$ | $\frac{1}{2}(r_x - r_y)^2$ |
| $w_i$ | $v_{zz}cs_i + v_{xx}rs_i + v_{yy}(1 - cs_i - rs_i) +$ $v_{xz}cs_irs_i + v_{yz}cs_i(1 - cs_i - rs_i) + v_{xy}rs_i(1 - cs_i - rs_i)$ |

TABLE 2-continued

| $g_i$ | $\dfrac{w_i}{w_{0i}}$ |
|---|---|
| $q_i$ | $\Delta t^2 w_i (1 - g_i)$ |
| $aa_1$ | $\dfrac{g_7 - g_4}{2\Delta y \Delta z}$ |
| $aa_2$ | $\dfrac{g_8 - g_5}{2\Delta z \Delta x}$ |
| $aa_3$ | $\dfrac{g_9 - g_6}{2\Delta x \Delta y}$ |
| $bb_1$ | $\dfrac{\Delta y^2 + \Delta z^2}{3\Delta y^2 \Delta z^2}(g_4 + g_7 - g_2 - g_3) + \dfrac{2q_4 + 2q_7 - q_2 - q_3}{6\Delta y^2 \Delta z^2}$ |
| $bb_2$ | $\dfrac{\Delta z^2 + \Delta x^2}{3\Delta z^2 \Delta x^2}(g_5 + g_8 - g_3 - g_1) + \dfrac{2q_5 + 2q_8 - q_3 - q_1}{6\Delta z^2 \Delta x^2}$ |
| $bb_3$ | $\dfrac{\Delta x^2 + \Delta y^2}{3\Delta x^2 \Delta y^2}(g_6 + g_9 - g_1 - g_2) + \dfrac{2q_6 + 2q_9 - q_1 - q_2}{6\Delta x^2 \Delta y^2}$ |

Extended to a case with TOR media, in order to get p(x, t+Δt) from p(x, t−Δt) and p(x, t), the following steps may be undertaken. Transformation of p(x, t) to p̂(k, t) via a FFT may be undertaken. Next, p̂(k, t) may be multiplied by $$\left[\dfrac{2(\cos(f(v_0, k)\Delta t) - 1)}{|k^2|}\right]$$

to get q̂(k, t), which may then be transformed to q(k, t) through the use of inverse FFT. Finite differences may be applied to q(k, t), utilizing the coefficients previously noted in Table 1, to generate u(x, t). Transformation of u(x, t) to û(x, t) via a FFT may be accomplished and correction terms $u_0$ in the wavenumber domain may be applied, such that $$\hat{u}_0(k, t) = \hat{u}_1(k, t) \dfrac{G(v_0, k)}{H(v_0, k)} \text{ and } \hat{u}_1(k, t) = \hat{u}_1(k, t) \dfrac{G(v_1, k)}{H(v_1, k)}$$

and, subsequently, transformation of $\hat{u}_0(k, t)$ and $\hat{u}_1(k, t)$ to $u_0(k, t)$ and $u_1(k, t)$, respectively, may be performed via the use of an inverse FFT. Subsequently, $u_0(x, t)$ and $u_1(x, t)$ may be combined, for example, according to local velocity variations to u(x, t) to result in p(x, t+Δt)←u(x, t+Δt)+2p(x, t)−p(x, t−Δt), whereby q(x, t), q̂(k, t), u(x, t), û(k, t), $u_0(x, t)$, $\hat{u}_0(k, t)$, $u_1(x, t)$, and $\hat{u}_1(k, t)$, are temporary functions. Additionally, $v_1$ represents model parameters at the location with minimum velocity, $G(v_1, k)$ is the exact response for Equation 5, $H(v_1, k)$ is an approximation by FD. Furthermore, $$\dfrac{G(v_1, k)}{H(v_1, k)}$$

is used as a correction term for the wavefield in the wavenumber domain at locations with relatively low density while $$\dfrac{G(v_0, k)}{H(v_0, k)}$$

is utilized as a second (e.g., the other) correction term.

The aforementioned process may be undertaken by the computing system 60 as a TORFFD wave propagation method. In some embodiments, at least some of the aforementioned steps may be performed in an alternative order or omitted entirely. Moreover, while the steps may be appreciated as being performed by the processor 64 of the computing system 60, it should be understood that any suitable devices or systems, or combination of suitable devices or systems, including the processor 64, may perform the aforementioned steps, such as processing units or circuitry of computing devices or systems external to, but communicatively coupled to, the computing system 60 and the execution of the steps may involve the processor 64 operating in conjunction with or utilizing software stored on a tangible machine readable medium to perform the aforementioned steps in generating a TORFFD wave propagation method (and associated wavefield propagator).

Additionally, it should be appreciated that the above described TORFFD TORFFD wave propagation method executed by the processor 64 represents a specific improvement over conventional systems, and an improved computing system 60 having improved functionality. In particular, utilizing the TORFFD wave propagation method and/or having a TORFFD wavefield propagator as part of the computing system improves, for example, accuracy and efficiency with respect to alternate wave propagation models and their associated waveform propagators by the computing system 60 when compared to performing seismic data analysis by, for example, computer systems performing conventional computer algorithms and/or performing seismic data analysis without the TORFFD wave propagation method and/or its associated TORFFD wavefield propagator.

Figure 6:
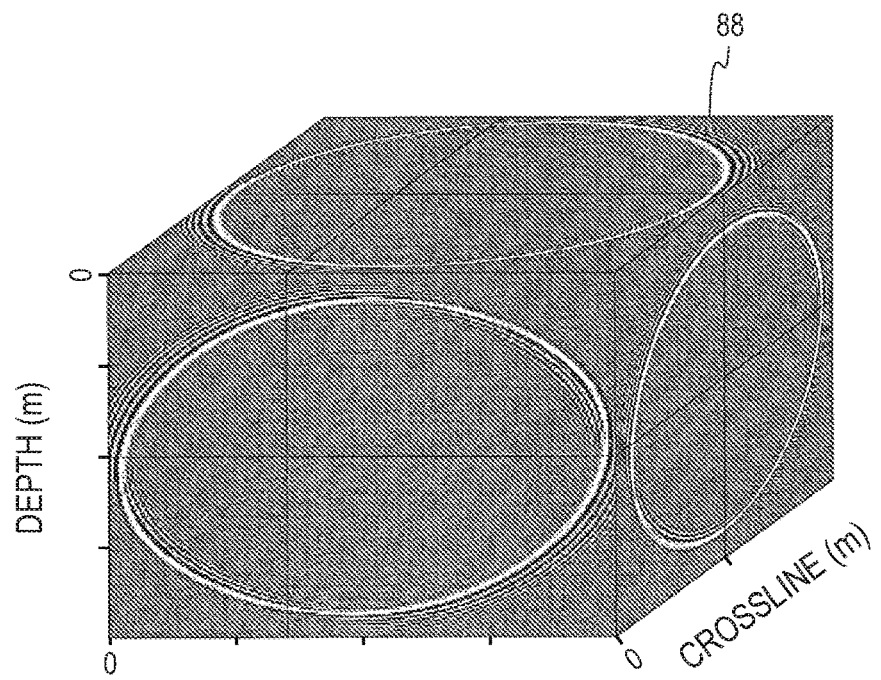
FIG. 6 illustrates pseudo-acoustic wavefield snapshots for two Tilted Orthorhombic modeling techniques applied by the computing system of FIG. 4, in accordance with embodiments presented herein.
Figure 6:
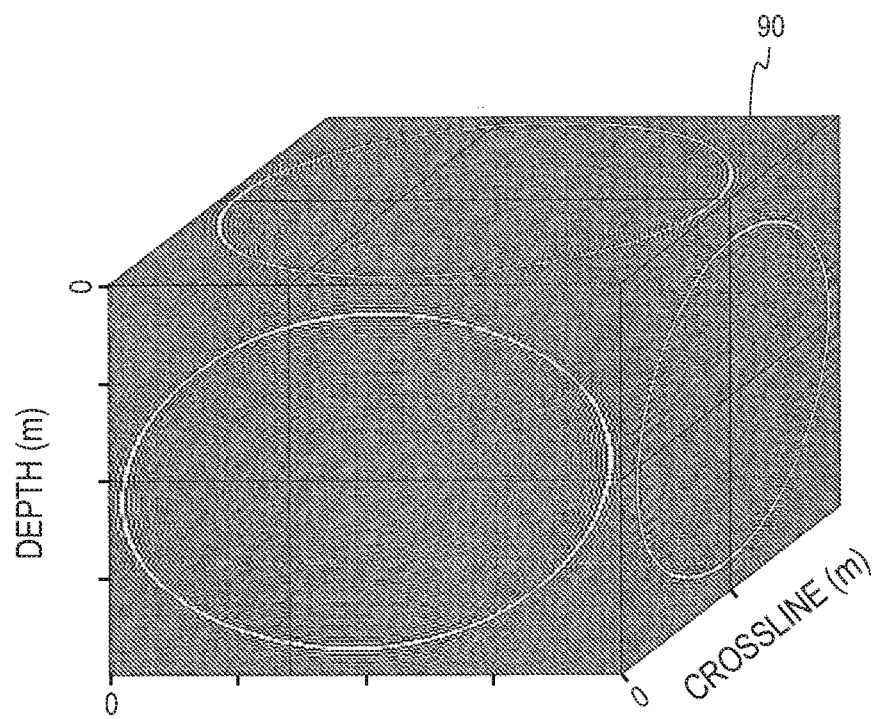

As a visual aid to represent some of the aforementioned advantages, FIG. 6 illustrates examples of wave propagator responses in a TOR model. A pseudo-acoustic wavefield snapshot 88 in a constant TOR model by a PS wave propagation method is illustrated in FIG. 6. Likewise, a FFD method (i.e., the TORFFD wave propagation method) pseudo-acoustic wavefield snapshot 90 in a constant TOR model is additionally illustrated. As may be observed, the pseudo-acoustic wavefield snapshot 90 possesses reduced dispersion than that present in pseudo-acoustic wavefield snapshot 88. Additionally, the process for generation of the pseudo-acoustic wavefield snapshot 90 is up to six times faster than the process for generation of the pseudo-acoustic wavefield snapshot 88. Additionally, use of both the PS wave propagation method and the PS wave propagation method possess an advantage for pseudo-acoustic wave propagation in that no coupling of qP-waves and qSv-waves is present.

Figure 7:
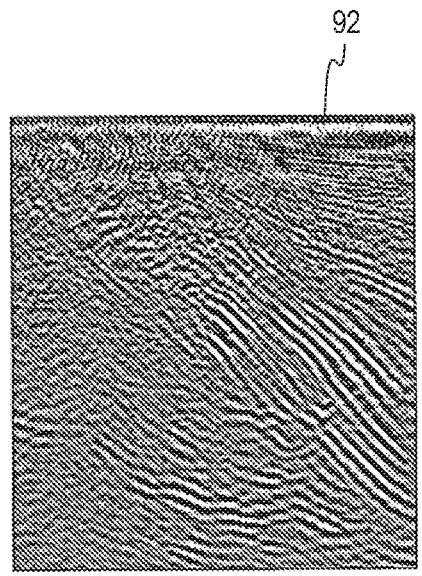
FIG. 7 illustrates an example of a first seismic image generated by the computing system of FIG. 4 utilizing a TTI wave propagation method, in accordance with embodiments presented herein.
Figure 8:
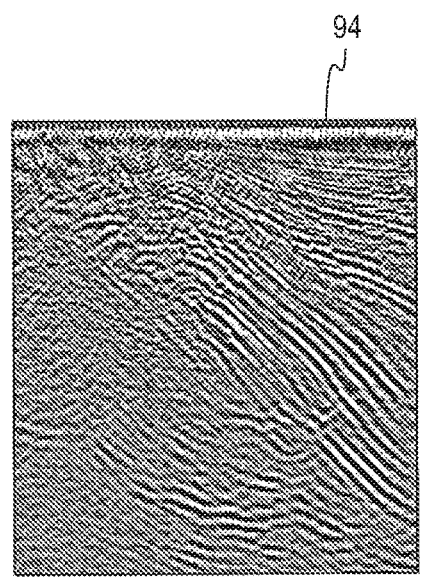
FIG. 8 illustrates an example of a first seismic image generated by the computing system of FIG. 4 utilizing a pseudo-spectral wave propagation method on Tilted Orthorhombic media, in accordance with embodiments presented herein.
Figure 9:
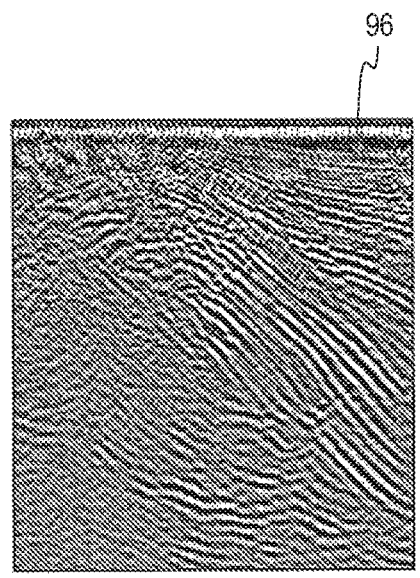
FIG. 9 illustrates an example of a first seismic image generated by the computing system of FIG. 4 utilizing a FFD wave propagation method on Tilted Orthorhombic media, in accordance with embodiments presented herein.

As a second set of examples of the advantages of the TORFFD wave propagation method, FIG. 7 illustrates a reverse time migration (RTM) image 92 generated utilizing a TTIFDD wave propagation method, FIG. 8 illustrates an RTM image 94 generated utilizing a PS wave propagation method, and FIG. 5 illustrates an RTM image 96 generated utilizing the above described the TORFFD wave propagation method. The runtime to generate the RTM image 92 and the RTM image 96 was approximately 20 minutes, while the runtime to generate the RTM image 94 was approximately two hours. Additionally, as may be appreciated, one can observe some main events in RTM image 92; however, the fault planes in the RTM image 92 do not appear to be clearly defined. In contrast, the fault boundary in the RTM image 96 is clearer than in RTM image 92, which allows for an improved ability to present strong azimuthal anisotropy. Additionally, events below or adjacent faults in the RTM image 96 are more clearly imaged with respect to the RTM image 92. The RTM image 94 likewise appears to provide improved imaging with respect to RTM image 92; however, it is noted that the runtime for the generation of RTM image 94 is approximately 6 times the runtime for the generation of the RTM image 96. Accordingly, utilization of the TORFFD wave propagation method appears to allow for the increased processing time associated with a TTI FFD wave propagation method while (at least) maintaining or approximating the image quality in a generated RTM image with respect to a PS wave propagation method being utilized.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for seismic data processing, comprising:
a processor, wherein the processor is configured to:
receive reservoir data of a hydrocarbon reservoir;
receive an indication related to selection of a wavefield propagator;
apply the wavefield propagator and finite differences to model a wavefield associated with a Tilted Orthorhombic media representative of a region of a subsurface comprising the hydrocarbon reservoir, at least in part, by applying a Fast Fourier Transform (FFT) to a seismic pressure wavefield associated with the wavefield propagator to obtain a transformed seismic pressure wavefield; and
process the reservoir data in conjunction the wavefield propagator to generate an output for use with seismic exploration above the region of the subsurface comprising the hydrocarbon reservoir and containing structural or stratigraphic features conducive to a presence, migration, or accumulation of hydrocarbons.

2. The system of claim 1, wherein the processor is configured to model the wavefield associated with the Tilted Orthorhombic media representative of the region of the subsurface comprising the hydrocarbon reservoir at least in part by producing a product of the transformed seismic pressure wavefield with a propagation velocity value to generate a first value.

3. The system of claim 2, wherein the processor is configured to model the wavefield associated with the Tilted Orthorhombic media representative of the region of the subsurface comprising the hydrocarbon reservoir at least in part by performing a transformation of the first value into a transformed first value.

4. The system of claim 3, wherein the processor is configured to apply an inverse FFT to the first value to perform the transformation of the first value.

5. The system of claim 3, wherein the processor is configured to model the wavefield associated with the Tilted Orthorhombic media representative of the region of the subsurface comprising the hydrocarbon reservoir at least in part by applying a finite differences operation utilizing a predetermined coefficient to the transformed first value to generate a second value.

6. The system of claim 5, wherein the processor is configured to model the wavefield associated with the Tilted Orthorhombic media representative of the region of the subsurface comprising the hydrocarbon reservoir at least in part by performing a transformation of the second value into a transformed second value.

7. The system of claim 6, wherein the processor is configured to apply the FFT to the second value to perform the transformation of the second value.

8. The system of claim 6, wherein the processor is configured to model the wavefield associated with the Tilted Orthorhombic media representative of the region of the subsurface comprising the hydrocarbon reservoir at least in part by applying a correction term in the wavenumber domain to the transformed second value to generate a modified second value.

9. The system of claim 8, wherein the processor is configured to model the wavefield associated with the Tilted Orthorhombic media representative of the region of the subsurface comprising the hydrocarbon reservoir at least in part by performing a transformation of the modified second value into a third value.

10. The system of claim 9, wherein the processor is configured to model the wavefield associated with the Tilted Orthorhombic media representative of the region of the subsurface comprising the hydrocarbon reservoir at least in part by applying a correction term in the wavenumber domain to the second value to generate a second modified second value.

11. The system of claim 10, wherein the processor is configured to model the wavefield associated with the Tilted Orthorhombic media representative of the region of the subsurface comprising the hydrocarbon reservoir at least in part by performing a transformation of the second modified second value into a fourth value.

12. The system of claim 11, wherein the processor is configured to model the wavefield associated with the Tilted Orthorhombic media representative of the region of the subsurface comprising the hydrocarbon reservoir at least in part by performing a transformation of the third value and the fourth value into a transformed third value and a transformed fourth value, respectively.

13. The system of claim 12, wherein the processor is configured to apply FFT to the third value and the fourth value to perform the transformation of the third value and the fourth value.

14. The system of claim 12, wherein the processor is configured to model the wavefield associated with the Tilted Orthorhombic media representative of the region of the subsurface comprising the hydrocarbon reservoir at least in part by combining the transformed third value with the transformed fourth value.

15. A method for seismic data processing implemented by a processor of a computing system, comprising:
  receiving reservoir data of a hydrocarbon reservoir;
  applying a wavefield propagator and Finite Differences to model a wavefield associated with a Tilted Orthorhombic media representative of a region of a subsurface comprising the hydrocarbon reservoir by applying a Fast Fourier Transform (FFT) to a seismic pressure wavefield associated with the wavefield propagator to obtain a transformed seismic pressure wavefield; and
  processing the reservoir data in conjunction the wavefield propagator to generate an output for use with seismic exploration above the region of the subsurface comprising a hydrocarbon reservoir and containing structural or stratigraphic features conducive to a presence, migration, or accumulation of hydrocarbons.

16. The method of claim 15, comprising modeling the wavefield associated with the Tilted Orthorhombic media representative of the region of the subsurface comprising the hydrocarbon reservoir at least in part by:
  producing a product of the transformed seismic pressure wavefield with a propagation velocity value to generate a first value;
  performing a transformation of the first value into a transformed first value;
  applying a finite differences operation utilizing a predetermined coefficient to the transformed first value to generate a second value;
  performing a transformation of the second value into a transformed second value applying a correction term in the wavenumber domain to the transformed second value to generate a modified second value;
  performing a transformation of the modified second value into a third value;
  applying a correction term in the wavenumber domain to the second value to generate a second modified second value;
  performing a transformation of the second modified second value into a fourth value;
  performing a transformation of the third value and the fourth value into a transformed third value and a transformed fourth value, respectively; and
  combining the transformed third value with the transformed fourth value.

17. One or more tangible, non-transitory, machine-readable media comprising instructions configured to cause a processor to process seismic data, wherein processing the seismic data comprises:
  applying a wavefield propagator and Finite Differences to model a wavefield associated with a Tilted Orthorhombic media representative of a region of a subsurface comprising the hydrocarbon reservoir by applying a Fast Fourier Transform (FFT) to a seismic pressure wavefield associated with the wavefield propagator to obtain a transformed seismic pressure wavefield; and
  processing the reservoir data in conjunction the wavefield propagator to generate an output for use with seismic exploration above the region of the subsurface comprising a hydrocarbon reservoir and containing structural or stratigraphic features conducive to a presence, migration, or accumulation of hydrocarbons.

18. The one or more machine-readable media of claim 17, wherein processing the seismic data further comprises modeling the wavefield associated with the Tilted Orthorhombic media representative of the region of the subsurface comprising the hydrocarbon reservoir at least in part by:
  producing a product of the transformed seismic pressure wavefield with a propagation velocity value to generate a first value;
  performing a transformation of the first value into a transformed first value;
  applying a finite differences operation utilizing a predetermined coefficient to the transformed first value to generate a second value;
  performing a transformation of the second value into a transformed second value
  applying a correction term in the wavenumber domain to the transformed second value to generate a modified second value;
  performing a transformation of the modified second value into a third value;
  applying a correction term in the wavenumber domain to the second value to generate a second modified second value;
  performing a transformation of the second modified second value into a fourth value;
  performing a transformation of the third value and the fourth value into a transformed third value and a transformed fourth value, respectively; and
  combining the transformed third value with the transformed fourth value.

* * * * *